(12) United States Patent
Torikura et al.

(10) Patent No.: US 11,170,229 B2
(45) Date of Patent: Nov. 9, 2021

(54) ATTITUDE ESTIMATION DEVICE

(71) Applicant: DENSO CORPORATION, Kariya (JP)

(72) Inventors: Takamichi Torikura, Kariya (JP); Yuki Yamagami, Kariya (JP); Kenji Okano, Kariya (JP)

(73) Assignee: DENSO CORPORATION, Kariya (JP)

( * ) Notice: Subject to any disclaimer, the term of this patent is extended or adjusted under 35 U.S.C. 154(b) by 241 days.

(21) Appl. No.: 16/332,996

(22) PCT Filed: Sep. 6, 2017

(86) PCT No.: PCT/JP2017/032100
§ 371 (c)(1),
(2) Date: Mar. 13, 2019

(87) PCT Pub. No.: WO2018/051862
PCT Pub. Date: Mar. 22, 2018

(65) Prior Publication Data
US 2019/0362160 A1    Nov. 28, 2019

(30) Foreign Application Priority Data
Sep. 15, 2016  (JP) .............................. JP2016-180480

(51) Int. Cl.
*G06K 9/00* (2006.01)
*G05D 1/08* (2006.01)
*G06K 9/32* (2006.01)
*G06K 9/46* (2006.01)

(52) U.S. Cl.
CPC .......... *G06K 9/00791* (2013.01); *G05D 1/08* (2013.01); *G06K 9/3233* (2013.01); *G06K 9/46* (2013.01)

(58) Field of Classification Search
CPC .................................. G01B 11/26; G05D 1/08
See application file for complete search history.

(56) References Cited

U.S. PATENT DOCUMENTS

| 5,331,563 A * | 7/1994 | Masumoto ............. G01C 21/28 340/988 |
| 5,424,953 A * | 6/1995 | Masumoto ............. G01C 21/28 340/988 |
| 2010/0235095 A1* | 9/2010 | Smitherman ........... G01S 19/14 701/532 |

(Continued)

FOREIGN PATENT DOCUMENTS

| CN | 203811184 U | * | 9/2014 |
| CN | 110954139 A | * | 4/2020 |
| JP | 2012-026992 A | | 2/2012 |

*Primary Examiner* — Gandhi Thirugnanam
(74) *Attorney, Agent, or Firm* — Maschoff Brennan

(57) ABSTRACT

An attitude estimation device acquires a plurality of images captured by a plurality of cameras mounted to a vehicle so as to form a plurality of overlap areas in each of which imaging areas partly overlap with each other. The attitude estimation device detects feature portions contained in regions on images respectively including appearances of the overlap areas. Then, the attitude estimation device calculates, for each of the overlap areas, an amount of positional offset between the feature portions detected from the plurality of images respectively including appearances of the overlap areas, and estimates an attitude of the vehicle, based on a difference in the amount of offset calculated for each of the plurality of overlap areas.

1 Claim, 5 Drawing Sheets

(56) References Cited

U.S. PATENT DOCUMENTS

| | | | | |
|---|---|---|---|---|
| 2011/0115922 | A1* | 5/2011 | Shimizu | G06T 7/80 |
| | | | | 348/188 |
| 2012/0016623 | A1* | 1/2012 | Hayner | G01D 18/00 |
| | | | | 702/141 |
| 2014/0118132 | A1* | 5/2014 | Braunberger | B60W 30/143 |
| | | | | 340/435 |
| 2015/0061492 | A1* | 3/2015 | Braunberger | B60Q 1/442 |
| | | | | 315/82 |
| 2015/0102917 | A1* | 4/2015 | Lee | G08C 17/00 |
| | | | | 340/12.54 |
| 2015/0262349 | A1* | 9/2015 | Li | G06T 7/73 |
| | | | | 348/135 |
| 2015/0292887 | A1* | 10/2015 | Haglund | G06T 7/74 |
| | | | | 701/468 |
| 2015/0332098 | A1* | 11/2015 | Wang | G06K 9/3241 |
| | | | | 382/103 |
| 2016/0290810 | A1* | 10/2016 | Zhi | G01C 25/005 |
| 2017/0011268 | A1* | 1/2017 | Yamaguchi | G06T 7/20 |
| 2017/0018087 | A1* | 1/2017 | Yamaguchi | G06T 7/73 |
| 2017/0146340 | A1* | 5/2017 | Yoon | G06T 7/73 |
| 2017/0151994 | A1* | 6/2017 | Braunberger | B62J 6/04 |
| 2017/0261315 | A1* | 9/2017 | Yamaguchi | G08G 1/16 |
| 2017/0284795 | A1* | 10/2017 | Carlson | B64C 17/00 |
| 2018/0180409 | A1* | 6/2018 | Watanabe | G06T 7/73 |
| 2019/0113348 | A1* | 4/2019 | Fukushima | G01C 21/20 |
| 2019/0362160 | A1* | 11/2019 | Torikura | G06K 9/00791 |
| 2020/0311514 | A1* | 10/2020 | Speranzon | G01C 25/005 |

\* cited by examiner

ATTITUDE ESTIMATION DEVICE

CROSS-REFERENCE TO RELATED APPLICATIONS

The present international application is a national stage application of PCT Application No. PCT/JP2017/032100, filed on Sep. 6, 2017, which claims the benefit of priority from earlier Japanese Patent Application No. 2016-180480 filed in Japan Patent Office on Sep. 15, 2016, the entire contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present invention relates to an attitude estimation device that estimates an attitude of a vehicle, based on images captured by cameras mounted to the vehicle.

BACKGROUND ART

PTL 1 describes a technique for estimating a pitch angle that is one of turning angles associated with an attitude of the vehicle, based on a plurality of images captured by an in-vehicle camera at different time points.

CITATION LIST

Patent Literature

[PTL 1] JP 2012-26992 A

SUMMARY OF THE INVENTION

The technique of PTL1 enables estimation of the pitch angle of the vehicle, based on the images captured by the in-vehicle camera, but does not consider estimating other turning angles, such as the roll angle or the yaw angle. As a result of detailed research, the inventors of the present disclosure have found an issue residing in the technique of PTL 1. Specifically, the technique of PTL 1 is inadequate for estimating a comprehensive attitude including the pitch angle, roll angle, the yaw angle, and the like of the vehicle.

In this regard, it is preferred that an aspect of the present disclosure is to provide a technique with which various physical quantities associated with an attitude of the vehicle can be estimated based on the images captured by cameras mounted to the vehicle.

An attitude estimation device according to an aspect of the present disclosure includes an image acquisition unit, a detection unit, an estimation unit, and an attitude information output unit.

The image acquisition unit is configured to acquire a plurality of images from a plurality of cameras mounted to the vehicle. These plurality of cameras are used for capturing images around the vehicle. The plurality of cameras are mounted to the vehicle such that a plurality of overlap areas, i.e., areas in each of which imaging areas partly overlap with each other, are formed at respective positions. The detection unit is configured to detect at least one feature portion for each of the plurality of images captured at around the same time by the image acquisition unit. The feature portion indicates a predetermined feature in each of the plurality of images respectively including appearances of the overlap areas.

The estimation unit is configured to estimate a physical quantity associated with an attitude of the vehicle, based on the feature portions detected by the detection unit. Specifically, the estimation unit calculates, for each of the overlap areas, an amount of positional offset between the feature portions detected from the plurality of images respectively including appearances of the overlap areas. Then, the estimation unit estimates a predetermined physical quantity associated with an attitude of the vehicle, based on a difference in the amount of offset calculated for each of the plurality of overlap areas. The attitude information output unit is configured to output information based on the physical quantity estimated by the estimation unit, as attitude information that is information indicating an attitude of the vehicle.

In the case where a plurality of cameras are mounted to a vehicle, attitude change of the vehicle entails displacement of the cameras. This displacement of the cameras further entails positional offset between the objects appearing in the overlapped imaging areas of the vehicle, depending on the direction or degree of the change in vehicle attitude. In this regard, the attitude estimation device according to the present disclosure allows a plurality of cameras to capture images, with the imaging areas partly overlapping with each other, and detects feature portions contained in the respective overlap areas of the images. Then, based on the amount of positional offset between feature portions for each of the overlap areas, an attitude of the vehicle is estimated. In this way, the technique that can estimate various physical quantities associated with an attitude of the vehicle can be implemented.

BRIEF DESCRIPTION OF THE DRAWINGS

The object set forth above, other objects, and characteristics and advantages of the present disclosure will be made clearer through the following description with reference to the accompanying drawings. The drawings are briefly described as follows.

DESCRIPTION OF THE EMBODIMENTS

With reference to the drawings, an embodiment of the present disclosure will be described. It should be noted that the present disclosure should not be limited to the following embodiment, but may be implemented in various modes.

(Configuration of Turning Angle Estimation Device)

Figure 1:
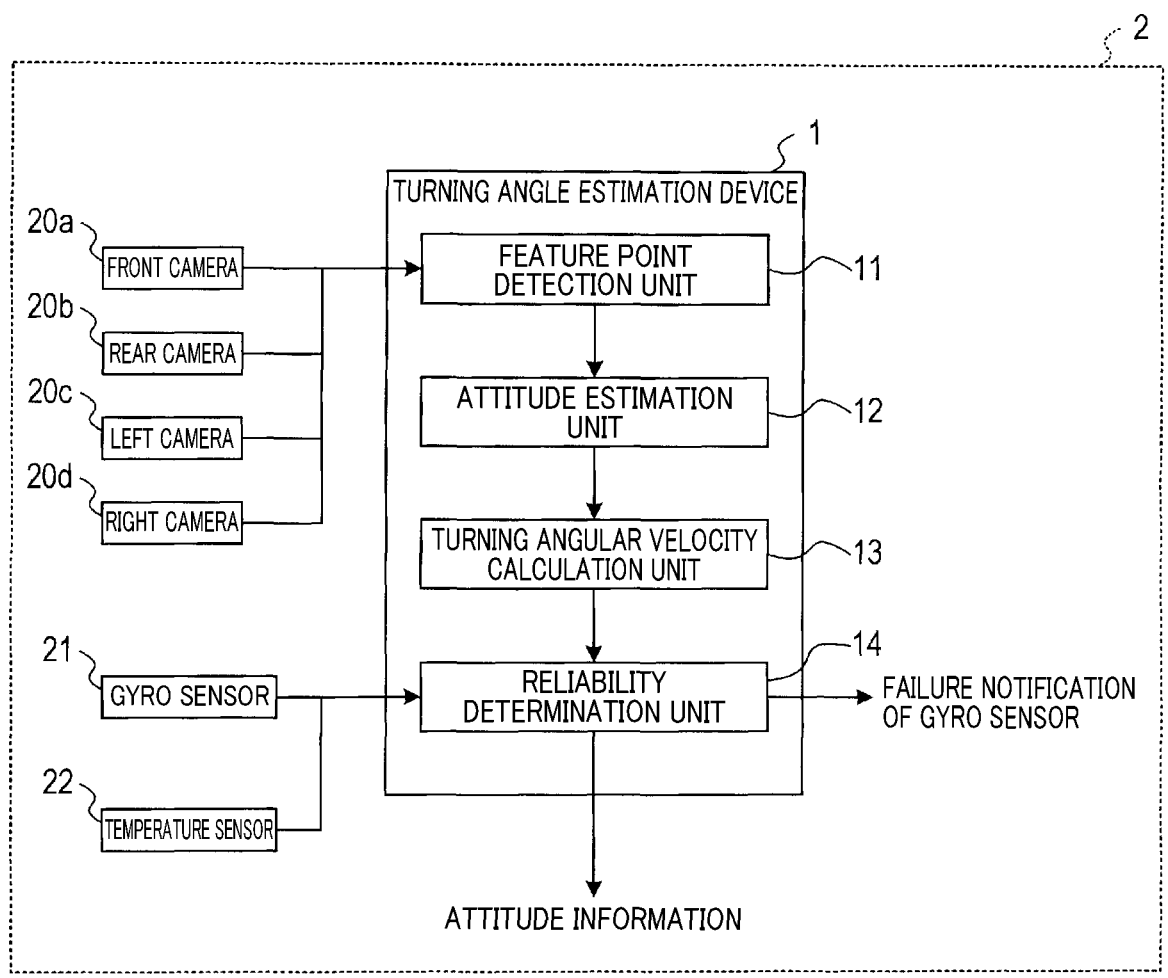
FIG. 1 is a block diagram illustrating a configuration of a turning angle estimation device according to an embodiment.

The present embodiment provides a turning angle estimation device 1 that is an electronic control unit installed in a vehicle 2. The turning angle estimation device 1 corresponds to the attitude estimation device of the present disclosure. As shown in FIG. 1, the turning angle estimation device 1 is connected to cameras 20a, 20b, 20c, 20d, a gyro sensor 21, and a temperature sensor 22, which are installed in the vehicle 2.

Figure 2:
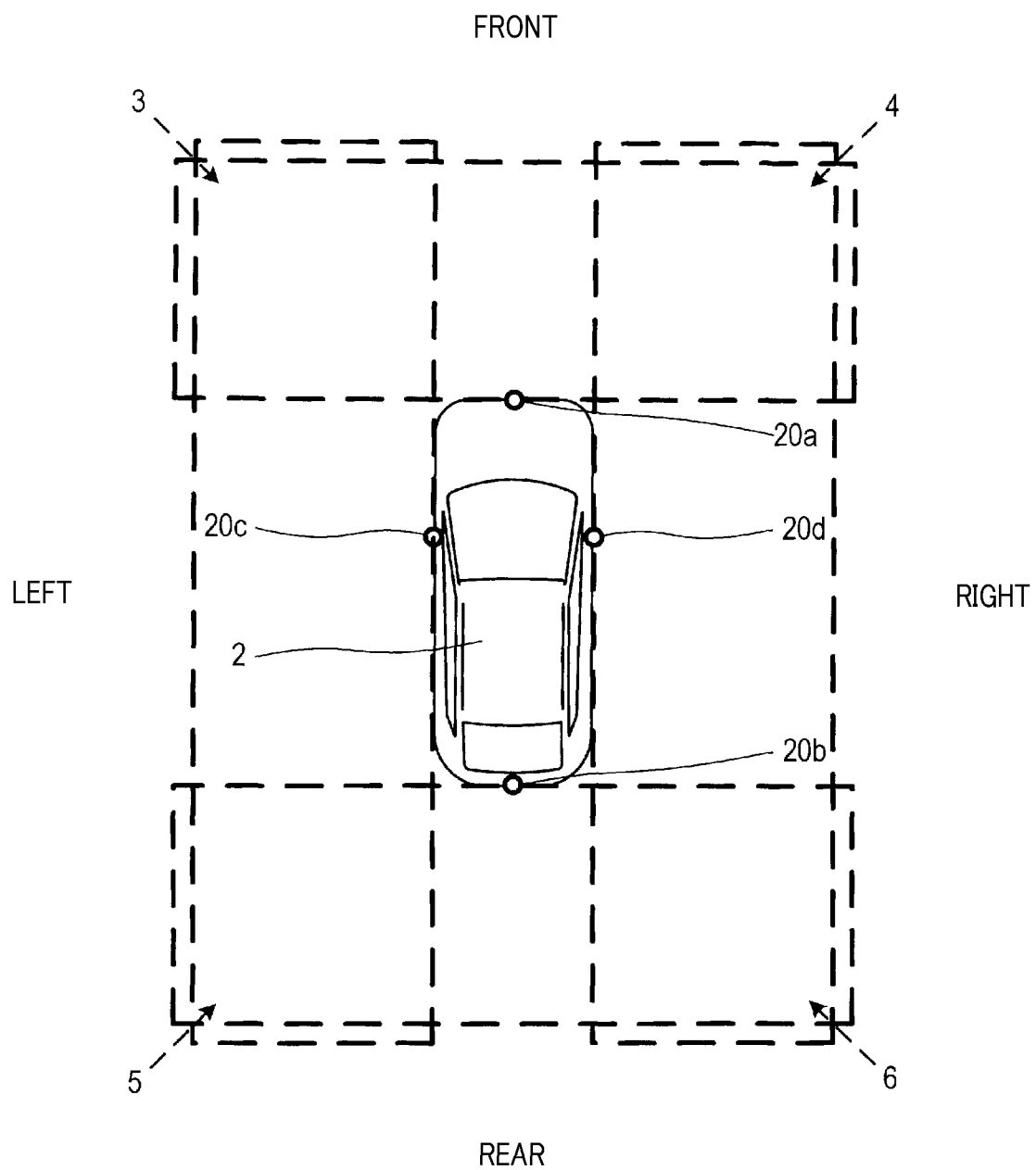
FIG. 2 is a diagram illustrating installation positions of cameras and imaging areas of the cameras.

As shown in FIG. 2, the four cameras 20a to 20d respectively serving as a front camera, a rear camera, a left camera, and a right camera are respectively mounted to the front, rear, left and right of the vehicle 2, so that the surroundings of the vehicle can be imaged. The cameras 20a to 20d are used for capturing images around the vehicle and, as indicated by the dotted lines in FIG. 2, respectively have imaging areas in the forward, rearward, rightward and leftward directions of the vehicle 2. The imaging areas of the cameras 20a to 20d include overlap areas 3, 4, 5 and 6 in the forward-left, forward-right, rearward-left, and rearward-right directions, respectively, of the vehicle 2. In these overlap areas, adjacent imaging areas of the cameras 20a to 20d overlap with each other.

The mounting positions and attitudes of the cameras 20a to 20d are preset relative to the vehicle 2 so that the imaging areas of the cameras 20a to 20d will be formed as described above. The actual installation positions of the cameras 20a to 20d are assumed to be adjusted at the manufacturing plants, the maintenance factories, or the like, based on the preset mounting positions and attitudes (i.e. imaging directions).

Referring back to FIG. 1, the gyro sensor 21 is a known measuring instrument that detects a turning angular velocity (e.g., yaw rate, pitch rate and/or roll rate) of the vehicle 2. The temperature sensor 22 is a known measuring instrument that measures an ambient temperature of the vehicle 2. The measurement results of the gyro sensor 21 and the temperature sensor 22 are inputted to the turning angle estimation device 1.

The turning angle estimation device 1 is an information processing unit which is mainly configured by a central processing unit (CPU), a random access memory (RAM), a read only memory (ROM), a semiconductor memory such as a flash memory, an input/output interface, and the like, all of which are not shown. The turning angle estimation device 1 is embodied, for example, by a microcontroller or the like which comprehensively has functions as a computer system. The functions of the turning angle estimation device 1 are implemented by the CPU executing the programs stored in a non-transitory tangible recording medium, such as a ROM or a semiconductor memory. The turning angle estimation device 1 may be configured by one or more microcontrollers.

The turning angle estimation device 1 has a function of estimating a physical quantity, such as a turning angle or a turning angular velocity, which indicates an attitude of the vehicle, based on the images captured by the cameras 20a to 20d. As the components for the function, the turning angle estimation device 1 includes a feature point detection unit 11, an attitude estimation unit 12, a turning angular velocity calculation unit 13, and a reliability determination unit 14. These components configuring the turning angle estimation device 1 may be implemented not only in a software manner, but also in a hardware manner, for part or all of the components, by combining a logic circuit, an analog circuit, and the like.

The turning angle estimation device 1 has a function of generating bird's-eye-view images as viewed from above the vehicle 2 by converting the plurality of images captured by the cameras 20a to 20d into viewpoints, by use of the mounting positions and the attitudes of the cameras 20a to 20d as camera parameters. The camera parameters are obtained, for example, by digitalizing the mounting positions of the cameras 20a to 20d on the vehicle 2, and the mounting angles of the cameras in triaxial directions, i.e., longitudinal, lateral, and vertical directions of the vehicle 2. When converting the images captured by the cameras 20a to 20d into viewpoints, the turning angle estimation device 1 uses conversion data that are set based on the camera parameters.

(Process Executed by the Turning Angle Estimation Device)

Referring to the flow diagram shown in FIGS. 3 and 4, a process executed by the turning angle estimation device 1 will be described. This process is iterated at a predetermined control cycle.

Figure 3:
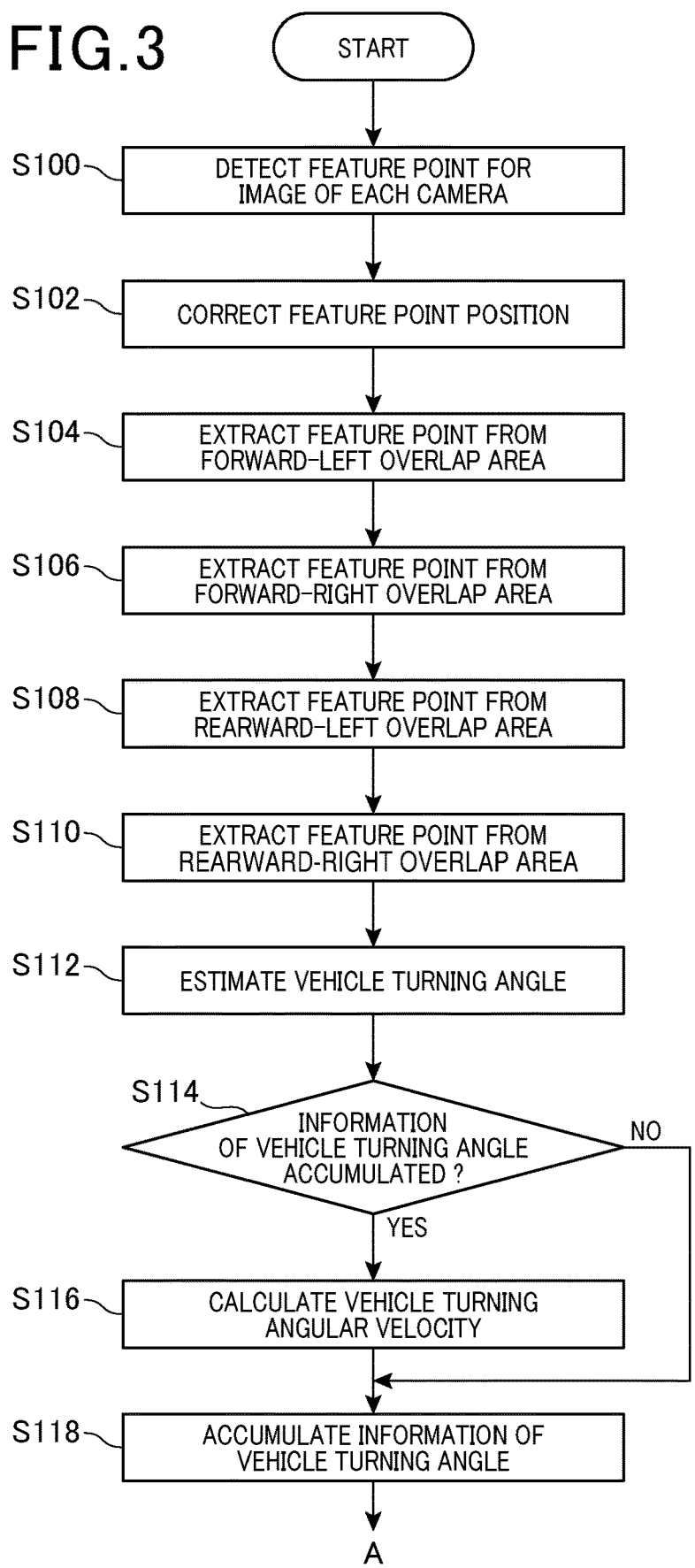
FIG. 3 is a flow diagram illustrating a process performed by a turning angle estimation device.

First, reference is made to the flow diagram shown in FIG. 3. At step S100, the turning angle estimation device 1 acquires a plurality of images captured by the cameras 20a to 20d around the same time. Then, the turning angle estimation device 1 detects a position of at least one feature point from each of bird's-eye-view images obtained by converting the plurality of images into viewpoints. The feature point refers to an image portion in which a specific object on the road surface appears. The object to be detected as a feature point may be one that can be easily distinguished from the road surface in each image. Examples of such an object include a division line or road marking of paint, studs, or stones, and a manhole cover.

At step S102, the turning angle estimation device 1 corrects a positional offset between the feature points detected at step S100. The positional offset between the feature points is attributed to the offset between the camera parameters from the actual mounting positions and attitudes of the cameras 20a and 20b, and the imbalance of the center of gravity of the vehicle 2. Known values are applied to the mounting positions and attitudes of the cameras 20a and 20b and to the imbalance of the center of gravity. The known values are obtained, for example, through measurements separately performed using a known method, based on the images captured by the cameras 20a and 20b. Steps S100 and S102 correspond to the processing as the feature point detection unit 11.

At step S104, the turning angle estimation device 1 extracts at least one feature point contained in an image area corresponding to the overlap area 3 in the left-forward direction from among one or more feature points detected at step S100, for each of the bird's-eye-view images of the front camera 20a and the left camera 20c. At step S106, the turning angle estimation device 1 extracts a feature point contained in an image area corresponding to the overlap area 4 in the right-forward direction from among the feature points detected at step S100, for each of the bird's-eye-view images of the front camera 20a and the right camera 20d.

At step S108, the turning angle estimation device 1 extracts a feature point contained in an image area corresponding to the overlap area 5 in the left-rearward direction from among the feature points detected at step S100, for each of the bird's-eye-view images of the rear camera 20b and the left camera 20c. At step S110, the turning angle estimation device 1 extracts a feature point contained in an image area corresponding to the overlap area 6 in the right-rearward direction from among the feature points detected at step S100, for each of the bird's-eye-view images of the rear camera 20b and the right camera 20d.

At step S112, the turning angle estimation device 1 estimates a turning angle (i.e., vehicle turning angle) indicating an attitude of the vehicle 2, based on the positions of the feature points, extracted at steps S104 to S110, in the bird's-eye-view images respectively corresponding to the overlap areas 3 to 6. In the present embodiment, for example, a pitch angle, a roll angle, a yaw angle, or the like is taken to be the vehicle turning angle estimated by the turning angle estimation device 1.

When acceleration, deceleration, and/or turning force due to turning are/is applied to the vehicle, the vehicle attitude may change. The change in vehicle attitude entails change in positions of the cameras 20a and 20b relative to the road surface that is an object to be imaged. Therefore, a common feature point is positionally offset between the two cameras capturing an image of the same overlap area. The degree of this offset depends on the position of the overlap area relative to the vehicle, and the direction and the degree of the attitude change.

Figure 5:
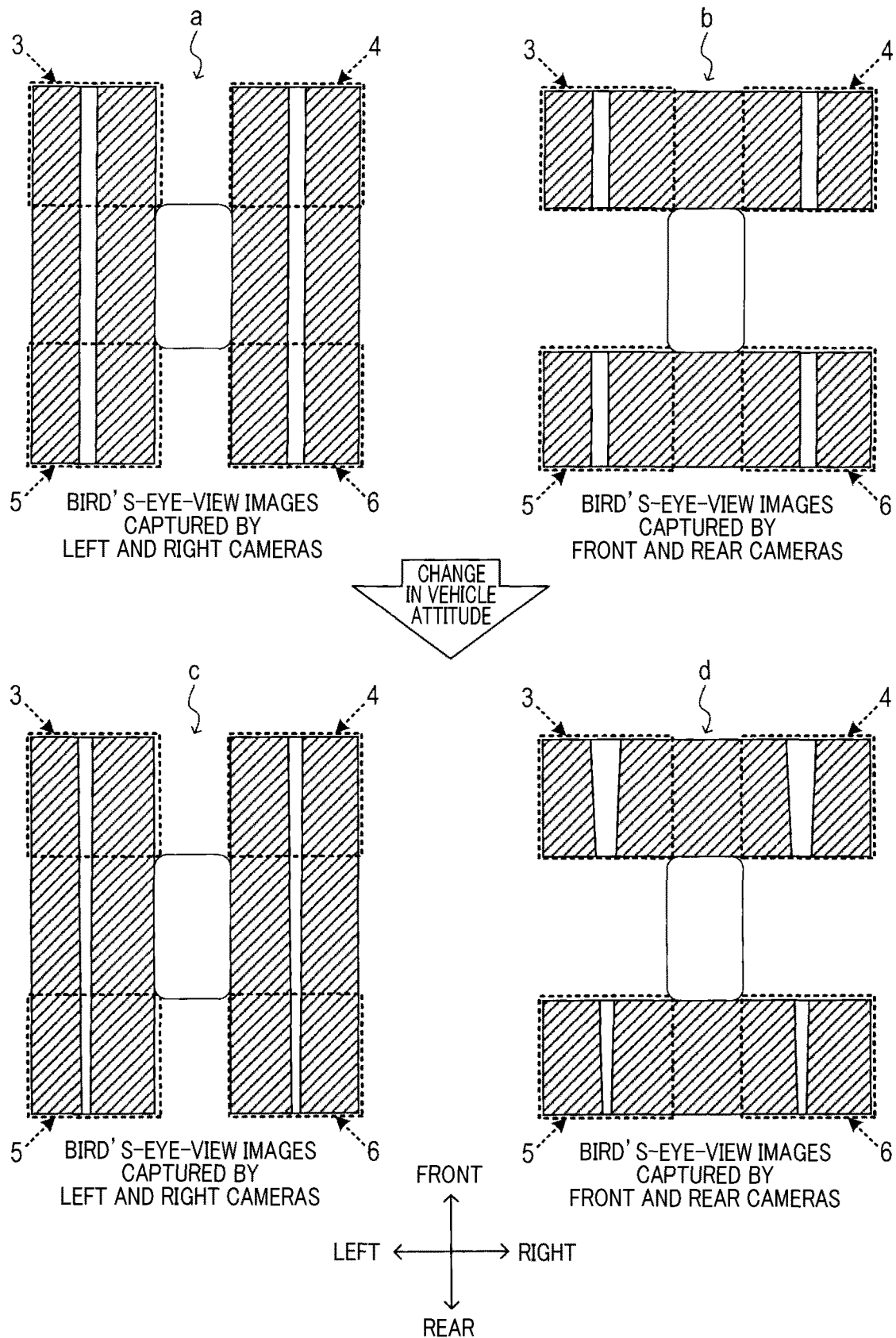
FIG. 5 is a set of diagrams illustrating change in captured images due to attitude change of the vehicle.

Referring to FIG. 5, specific examples will be described. In FIG. 5, a shows bird's-eye-view images captured by the left and right cameras 20c and 20d before occurrence of attitude change in the vehicle 2. b shows bird's-eye-view images captured by the front and rear cameras 20a and 20b around the same time as a. c shows bird's-eye-view images captured by the left and right cameras 20c and 20d when the pitch angle has so changed as to allow the vehicle to lean forward due to rapid deceleration. d shows bird's-eye-view images captured by the front and rear cameras 20a and 20b around the same time as c. In the examples shown in FIG. 5, division lines of the road drawn along the advancing direction are detected as feature points.

When the pitch angle has so changed as to allow the vehicle to lean forward due to rapid deceleration, the front camera 20a is displaced greater than other cameras. In this case, as shown in FIG. 5, a comparatively great difference arises in the appearance of the division lines, as feature points, in the overlap areas 3 and 4, between the bird's-eye-view images c captured by the left and right cameras 20c and 20d, and the bird's-eye-view images d captured by the front camera 20a.

When the attitude of the vehicle has so changed as to lean forward, displacement of the rear camera 20b will be small compared to that of the front camera 20a. Therefore, as shown in FIG. 5, there arises not so great a difference in the appearance of the division lines, as feature points, in the overlap areas 5 and 6, between the bird's-eye-view images c captured by the left and right cameras 20c and 20d, and the bird's-eye-view images d captured by the rear camera 20b.

In this regard, the turning angle estimation device 1 compares the amount of offset between feature points in the front-side overlap areas 3 and 4, with the amount of offset between feature points in the rear-side overlap areas 5 and 6, respectively, and estimates a pitch angle, based on the magnitude relationship in the amount of offset. Similarly, the turning angle estimation device 1 can compare the amount of offset between feature points in the left-side overlap areas 3 and 5, with the amount of offset between feature points in the right-side overlap areas 4 and 6, respectively, and estimates a roll angle, based on the magnitude relationship in the amount of offset. The turning angle estimation device 1 estimates a yaw angle from the angle of the division line detected by each of the cameras 20a to 20d, relative to the longitudinal direction of the vehicle.

Referring to the flow diagram of FIG. 3, the processing at steps S104 to S112 corresponds to the processing as the attitude estimation unit 12. At the subsequent step S114, the turning angle estimation device 1 determines whether a necessary amount of time-series information regarding vehicle turning angle has been accumulated for a past predetermined period from the current point. If the necessary amount of time-series information has not been accumulated (i.e., NO at step S114), the turning angle estimation device 1 allows processing to proceed to step S118.

At step S118, the turning angle estimation device 1 accumulates the vehicle turning angle obtained at step S112 in the memory as time-series information. If it is determined that the necessary amount of time-series information has been accumulated (i.e., YES at step S114), the turning angle estimation device 1 allows processing to proceed to step S116.

At step S116, the turning angle estimation device 1 calculates a vehicle turning angular velocity indicating a time rate of change of vehicle turning angle. The vehicle turning angular velocity is calculated based on the vehicle turning angle obtained at step S112, and the time-series information of vehicle turning angle that has been accumulated for the past predetermined period from the current point. The vehicle turning angular velocity is calculated, for example, as a value obtained by dividing a variation of vehicle turning angle indicated in a time-series manner, by an elapsed time in the time series. In the present embodiment, for example, a pitch rate, a roll rate, a yaw rate, or the like is taken to be the vehicle turning angular velocity estimated by the turning angle estimation device 1.

The necessary amount of information of vehicle turning angle that is used for calculating a vehicle turning angular velocity may be accumulated at least for one calculation, but more amount of information may be accumulated. For example, if the amount of necessary information of vehicle turning angle is increased, robustness is improved accordingly in the result of calculation of a vehicle turning angular velocity for unexpected noise. However, this increase may deteriorate conformability of the calculated vehicle turning angular velocity, to an abrupt change of vehicle turning angle. If the amount of necessary information of vehicle turning angle is decreased, this decrease may improve conformability of the calculated vehicle turning angular velocity, to an abrupt change of vehicle turning angle. However, this decrease may deteriorate robustness in the result of calculation of a vehicle turning angular velocity for unexpected noise. Thus, robustness and responsiveness in the results of calculation of a vehicle turning angular velocity are in a trade-off relationship, depending on the amount of necessary information of vehicle turning angle used for calculating a vehicle turning angular velocity.

Following step S116, the turning angle estimation device 1 performs the processing of step S118. It should be noted that the processing of steps S114 to S118 corresponds to the processing as the turning angle calculation unit 13.

Figure 4:
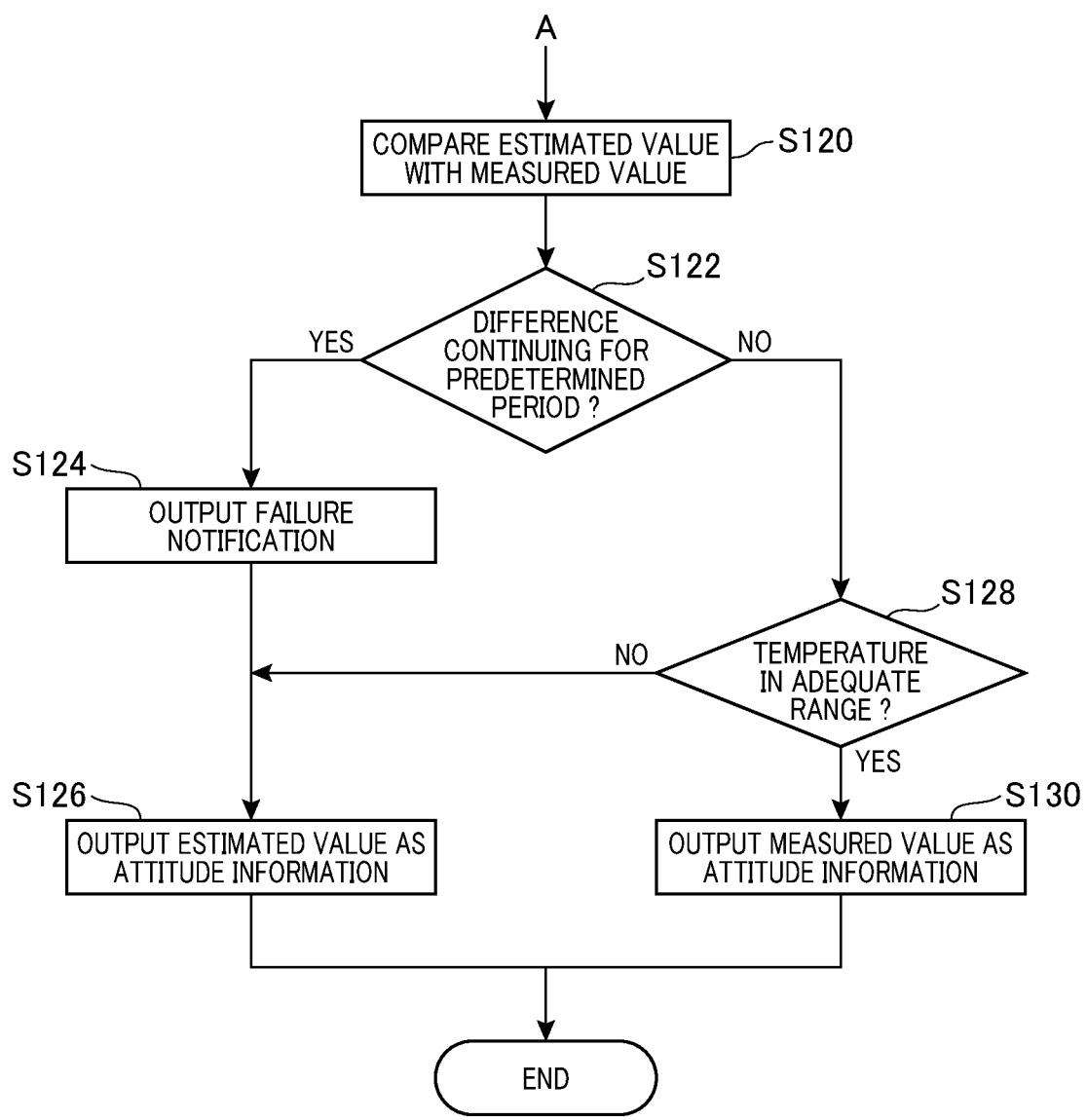
FIG. 4 is a flow diagram illustrating the process performed by the turning angle estimation device.

Reference is now made to the flow diagram of FIG. 4. At step S120, the turning angle estimation device 1 calculates a difference between the vehicle angular velocity estimated at step S116 and the latest measurement derived from the gyro sensor 21. Then, the turning angle estimation device 1 accumulates the calculated difference as a comparison result. At step S122, the turning angle estimation device 1 determines whether the difference between the estimated vehicle angular velocity and the measurement derived from the gyro sensor 21 is continuing to be not less than a predetermined value, for the comparison results accumulated at step S120 for a past predetermined period from the current point.

At step S122, reliability of the gyro sensor 21 is determined. Specifically, if there is no noticeable difference between the vehicle turning angular velocity estimated from the images captured by the cameras 20a to 20d, and the vehicle turning angular velocity measured by the gyro sensor 21, the gyro sensor 21 is determined to be normally functioning. If there is some difference, which is continuing for a predetermined period, between the vehicle turning angular velocity estimated from the images captured by the cameras 20a to 20d, and the vehicle turning angular velocity measured by the gyro sensor 21, reliability of the gyro sensor 21 is determined to be unreliable.

If the difference of comparison result being not less than a predetermined value continues for a predetermined period (i.e., YES at step S122), the turning angle estimation device 1 allows processing to proceed to step S124. At step S124, the turning angle estimation device 1 outputs a failure notification, or information indicating failure of the gyro sensor 21, to an output device or the like, not shown, installed in the vehicle 2. At step S126, the turning angle estimation device 1 outputs the vehicle turning angle estimated at step S112, and the vehicle turning angular velocity calculated at S116, as attitude information, i.e., information indicating an attitude of the vehicle 2.

If the difference of comparison result being not less than a predetermined value is determined as not continuing for a predetermined period (i.e., NO at step S122), the turning angle estimation device 1 allows processing to proceed to step S128. At step S128, the turning angle estimation device 1 determines whether the ambient temperature of the vehicle 2 is in a suitable range, based on the measurement acquired from the temperature sensor 22.

The suitable range of the ambient temperature may, for example, be a temperature range with which the performance of the gyro sensor 21 is guaranteed. It is generally known that measurement performance of gyro sensors installed in vehicles or the like is impaired under extremely high or low temperature conditions. In this regard, in the configuration of the present embodiment, whether to use the measurement of the gyro sensor 21 is ensured to be determined at S122, according to the ambient temperature.

If the ambient temperature is out of the suitable range (i.e., NO at step S128), the turning angle estimation device 1 allows processing to proceed to step S126. At step S126, the turning angle estimation device 1 outputs the vehicle turning angle estimated at step S112, and the vehicle turning angular velocity calculated at step S116, as attitude information, i.e. information indicating an attitude of the vehicle 2.

If the ambient temperature is within the suitable range (i.e., YES at step S128), the turning angle estimation device 1 allows processing to proceed to step S130. At step S130, the turning angle estimation device 1 outputs the vehicle turning angular velocity detected by the gyro sensor 21 as attitude information, i.e. information indicating an attitude of the vehicle 2.

Advantageous Effects

According to the turning angle estimation device 1 of the embodiment, the following advantageous effects are exerted.

The turning angle estimation device 1 detects feature points contained in regions where overlap areas appear, from the bird's-eye-view images captured by the plurality of cameras 20a to 20d whose imaging areas partly overlap with each other. As a result of the detection, the turning angle estimation device 1 can estimate a vehicle turning angle indicating an attitude of the vehicle, based on the amount of offset between the feature points for each of the plurality of overlap areas. Thus, the turning angle estimation device 1 can be an alternative to the gyro sensor 2. Otherwise, combining the turning angle estimation device 1 with the gyro sensor 21, the means for detecting an attitude of the vehicle can be made redundant.

Furthermore, comparing the vehicle attitude estimated based on the bird's-eye-view images captured by the cameras 20a to 20d, with the vehicle attitude measured by the gyro sensor 21, reliability of the gyro sensor 21 can be determined. With this configuration, for example, a failure notification can be outputted for the gyro sensor 21 under conditions where reliability of the gyro sensor 21 is determined to be unreliable. In addition, from the perspective of failsafe, configuration enables control of making the measurement of the gyro sensor 21 ineffective.

Furthermore, the attitude information based on the images, or the attitude information based on the measurement of the gyro sensor 21 can be selectively outputted according to the ambient temperature. With this configuration, favorable one of pieces of attitude information can be outputted according to the environments of the vehicle. Consequently, this configuration contributes to improving measurement accuracy of the attitude information.

(Correlation of Components in the Embodiment)

The feature point detection unit 11 corresponds to an example of the image acquisition unit and the detection unit. The attitude estimation unit 12 and the turning angular velocity calculation unit 13 correspond to an example of the estimation unit. The reliability determination unit 14 corresponds to an example of the attitude information output unit, the reliability information determination unit, the reliability information output unit, and the environment determination unit.

(Modifications)

The function of one component in the embodiments described above may be distributed to a plurality of components, or the functions of a plurality of components may be permitted to be exerted by one component. Moreover, part of the configuration of each embodiment described above may be omitted. Moreover, at least part of the configuration of an embodiment described above may be added to or replaced by the configuration of another embodiment described above. It should be noted that all the modes, which are contained in the technical idea specified by the language of the claims, should be embodiments of the present disclosure.

The embodiment set forth above has been described by way of an example of estimating a vehicle attitude on the basis of the images captured by the four cameras 20a to 20d. However, the present disclosure should not be limited to this example. It may be so configured that a vehicle attitude is estimated based the images captured by more than or less than four cameras, as long as a plurality of overlap areas are formed in each of which the imaging areas are partly overlap with each other.

The present disclosure may be implemented in various modes, such as a system including the turning angle estimation device 1 as a component, a program for allowing a computer to function as the turning angle estimation device 1, a non-transitory tangible recording medium in which this program is recorded, and a method of estimating a vehicle turning angle.

The invention claimed is:

1. An attitude estimation device comprising:
   an image acquisition unit that is configured to acquire, using a processor, a plurality of images from a plurality of cameras mounted to a vehicle to capture images around the vehicle, the plurality of cameras being mounted such that a plurality of overlap areas are formed, the plurality of overlap areas being areas in each of which imaging areas partly overlap with each other;

a detection unit that is configured to detect, using the processor, at least one feature portion that is a portion indicating a predetermined feature in a region on each of a plurality of images respectively including appearances of the overlap areas, the plurality of images being acquired by the image acquisition unit around the same time;

an estimation unit that is configured to calculate, using the processor, for each of the overlap areas, an amount of positional offset between the feature portions detected from the plurality of images respectively including appearances of the overlap areas, and estimate a predetermined physical quantity associated with an attitude of the vehicle, based on a difference in the amount of offset calculated for each of the plurality of overlap areas;

an attitude information output unit that is configured to output information, using the processor, based on the physical quantity estimated by the estimation unit, as attitude information that is information indicating an attitude of the vehicle;

a reliability determination unit that is configured to determine, using the processor, a reliability of a gyro sensor provided to the vehicle, based on a result of comparing the attitude of the vehicle indicated by a physical quantity estimated by the estimation unit, with a measurement associated with an attitude of the vehicle derived from the gyro sensor; and a reliability information output unit that is configured to output, using the processor, unreliability information that is information indicating that the reliability of the gyro sensor is determined to be unreliable, when the reliability of the gyro sensor is determined to be unreliable by the reliability determination unit.

* * * * *